United States Patent
Chang et al.

(10) Patent No.: US 8,255,670 B2
(45) Date of Patent: *Aug. 28, 2012

(54) REPLAY REDUCTION FOR POWER SAVING

(75) Inventors: Po-Yung Chang, Saratoga, CA (US);
Wei-Han Lien, San Jose, CA (US);
Jesse Pan, San Jose, CA (US); Ramesh Gunna, San Jose, CA (US); Tse-Yu Yeh, Cupertino, CA (US); James B. Keller, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 12/619,751

(22) Filed: Nov. 17, 2009

(65) Prior Publication Data

US 2010/0064120 A1    Mar. 11, 2010

Related U.S. Application Data

(63) Continuation of application No. 11/546,223, filed on Oct. 10, 2006, now Pat. No. 7,647,518.

(51) Int. Cl.
*G06F 9/30* (2006.01)
*G06F 9/40* (2006.01)
*G06F 15/00* (2006.01)
(52) U.S. Cl. ...................................................... 712/214
(58) Field of Classification Search .................. 712/214, 712/215; 713/300, 320
See application file for complete search history.

(56) References Cited

U.S. PATENT DOCUMENTS

| | | |
|---|---|---|
| 6,542,984 B1 | 4/2003 | Keller et al. |
| 6,792,446 B2 | 9/2004 | Merchant et al. |
| 6,912,648 B2 | 6/2005 | Hammarlund et al. |
| 6,976,152 B2 | 12/2005 | Yeh et al. |
| 7,200,737 B1 | 4/2007 | Merchant et al. |
| 7,203,817 B2 | 4/2007 | Yeh |
| 7,269,714 B2 | 9/2007 | Yeh et al. |
| 7,502,914 B2 | 3/2009 | Dhodapkar |
| 7,647,518 B2 | 1/2010 | Chang et al. |
| 2003/0061470 A1 | 3/2003 | Yeh |
| 2005/0071603 A1 | 3/2005 | Jamil et al. |

OTHER PUBLICATIONS

P.A. Semi, "The PWRficient Processor Family," Oct. 2005, pp. 1-31.

*Primary Examiner* — Corey S Faherty
(74) *Attorney, Agent, or Firm* — Lawrence J. Merkel; Meyertons, Hood, Kivlin, Kowert & Goetzel, P.C.

(57) ABSTRACT

In one embodiment, a processor comprises a scheduler configured to issue a first instruction operation to be executed and an execution core coupled to the scheduler. Configured to execute the first instruction operation, the execution core comprises a plurality of replay sources configured to cause a replay of the first instruction operation responsive to detecting at least one of a plurality of replay cases. The scheduler is configured to inhibit issuance of the first instruction operation subsequent to the replay for a subset of the plurality of replay cases. The scheduler is coupled to receive an acknowledgement indication corresponding to each of the plurality of replay cases in the subset, and is configured to inhibit issuance of the first instruction operation until the acknowledgement indication is asserted that corresponds to an identified replay case of the subset.

11 Claims, 5 Drawing Sheets

| Type Bit | Description |
|---|---|
| 0 | Immediate (no Ack) |
| 1 | MMU (no Ack Initial Time, Ack Subsequent Time) |
| 2 | LSQ (Ack) |
| 3 | MRB (Ack) |
| 4 | larx with RSV set (Ack or Oldest) |

REPLAY REDUCTION FOR POWER SAVING

This application is a continuation of U.S. application Ser. No. 11/546,223 filed Oct. 10, 2006 now U.S. Pat. No. 7,647,518.

BACKGROUND

1. Field of the Invention

This invention is related to the field of processors and, more particularly, to reducing replay occurrence in processors. This application is a continuation of U.S. application Ser. No. 11/546,223 filed Oct. 10, 2006.

2. Description of the Related Art

Managing power consumption in processors is increasingly becoming a priority. In many systems, the power supply is at least sometimes a battery or other stored-charge supply. Maximizing battery life in such systems is often a key selling feature. Additionally, even in systems that have effectively limitless power (e.g. systems plugged into a wall outlet), the challenges of cooling the processors and other circuits in the system may be reduced if power consumption can be reduced in the processors.

Some processors implement replay, in which an instruction (or instruction operation) is issued for execution and, during execution, a condition is detected that causes the instruction to be reissued again at a later time. Instructions can also be replayed if a preceding instruction is replayed (particularly if the instructions depend on the previous instructions). If an instruction is replayed due to a condition that may take some time to clear, it is likely that the instruction will be issued and replayed repeatedly until the condition is cleared. The power consumed in issuing the instruction, only to be replayed, is wasted.

SUMMARY

In one embodiment, a processor comprises a scheduler configured to issue a first instruction operation to be executed and an execution core coupled to the scheduler. The execution core is configured to execute the first instruction operation, wherein the execution core comprises a plurality of replay sources configured to cause a replay of the first instruction operation responsive to detecting at least one of a plurality of replay cases. Each of the plurality of replay sources is configured to detect one or more of the plurality of replay cases. The scheduler is configured to inhibit issuance of the first instruction operation subsequent to the replay for a subset of the plurality of replay cases. The scheduler is coupled to receive an acknowledgement indication corresponding to each of the plurality of replay cases in the subset, and is configured to inhibit issuance of the first instruction operation until the acknowledge indication is asserted that corresponds to an identified replay case of the subset. A similar method is also contemplated.

BRIEF DESCRIPTION OF THE DRAWINGS

The following detailed description makes reference to the accompanying drawings, which are now briefly described.

Figure 1:
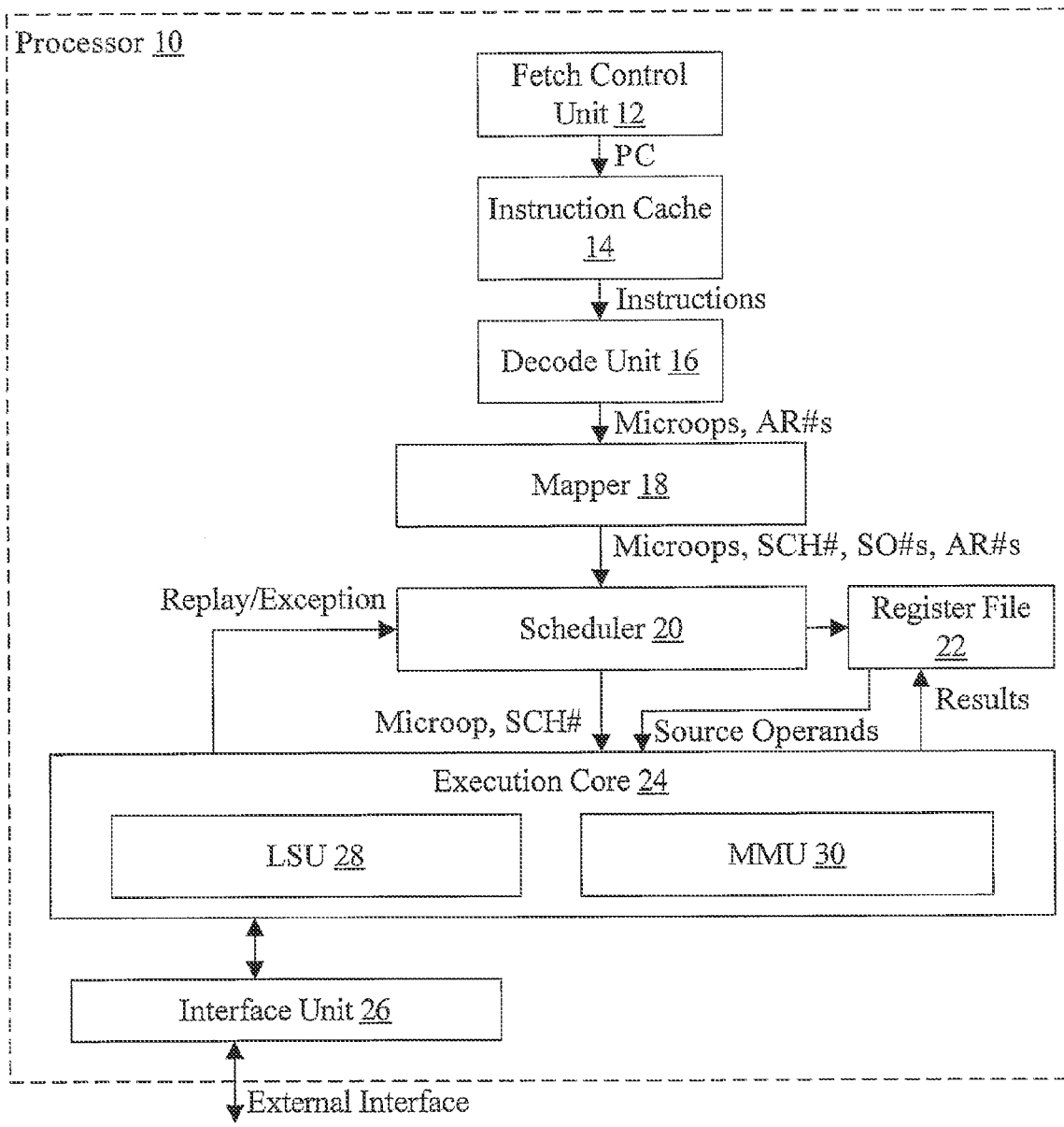
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Processor Overview

An example implementation will be described in more detail below for an embodiment of a processor that implements the PowerPC™ instruction set architecture. Other instruction set architectures may be implemented in other embodiments. Exemplary instruction set architectures that may be implemented in other embodiments may include the ARM™ instruction set, the MIPS™ instruction set, the SPARC™ instruction set, the x86 instruction set (also referred to as IA-32), the IA-64 instruction set, etc.

Turning now to FIG. 1, a block diagram of one embodiment of a processor 10 is shown. In the illustrated embodiment, the processor 10 includes a fetch control unit 12, an instruction cache 14, a decode unit 16, a mapper 18, a scheduler 20, a register file 22, an execution core 24, and an interface unit 26. The fetch control unit 12 is coupled to provide a program counter (PC) for fetching from the instruction cache 14. The instruction cache 14 is coupled to provide instructions to the decode unit 16, which is coupled to provide microops to the mapper 18 (including architected register numbers (AR#s) of registers used by the microops for either source operands or as a destination). The mapper 18 is coupled to provide microops, a scheduler number (SCH#), source operand numbers (SO#s), and AR#s to the scheduler 20. The scheduler 20 is coupled to receive replay/exception signals from the execution core 24, is coupled to the register file 22, and is coupled to provide microops for execution to the execution core 24 (and a SCH# for each microop). The register file 22 is coupled to provide source operands to the execution core 24, and is coupled to receive results to be written to the register file 22 from the execution core 24. The execution core 24 is coupled to the interface unit 26, which is further coupled to an external interface of the processor 10. The execution core 24 includes, in the illustrated embodiment, a load/store unit (LSU) 28 and a memory management unit (MMU) 30.

The fetch control unit 12 may comprise any circuitry used to generate PCs for fetching instructions. The fetch control unit 12 may include, for example, branch prediction hardware used to predict branch instructions and to fetch down the predicted path. The fetch control unit 12 may also be redirected (e.g. via misprediction, exception, interrupt, flush, etc.).

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache line size. For example, 64 byte cache lines may be implemented in one embodiment. Other embodiments may use larger or smaller cache line sizes. In response to a given PC from the fetch control unit 12, the instruction cache 14 may output up to a maximum number of instructions. For example, up to 4 instructions may be output in one embodiment. Other embodiments may use more or fewer instructions as a maximum.

The decode unit 16 may generally be configured to generate microops for each instruction provided from the instruction cache 14. Microops may be an example of instruction operations Generally, an instruction operation may be an operation that the hardware included in the execution core 24 is capable of executing. Each instruction may translate to one or more instruction operations (e.g. microops) which, when executed, result in the performance of the operations defined for that instruction according to the instruction set architecture. The decode unit 16 may include any combination of circuitry and/or microcoding in order to generate microops for instructions. For example, relatively simple microop generations (e.g. one or two microops per instruction) may be handled in hardware while more extensive microop generations (e.g. more than three microops for an instruction) may be handled in microcode. The number of microops generated per instruction in hardware versus microcode may vary from embodiment to embodiment. In some embodiments, there may be a one-to-one correspondence between instruction operations (microops) and instructions. That is, instruction operations may simply be decoded instructions in such a case.

Microops generated by the decode unit 16 may be provided to the mapper 18. The mapper 18 may implement register renaming to map source register addresses from the microops to the source operand numbers (SO#s) identifying the renamed source registers. Additionally, the mapper 18 may assign a scheduler entry to store each microop, identified by the SCH#. In one embodiment, the SCH# may also identify the rename register assigned to the destination of the microop. In other embodiments, the mapper 18 may assign a separate destination register number.

The mapper 18 may provide the microops, along with SCH#, SO#s, and AR#s for each microop to the scheduler 20. The scheduler 20 may store the microops in the scheduler entries identified by the respective SCH#s, along with the SO#s and AR#s. More particularly, a buffer within the scheduler 20 may comprise the scheduler entries and may be written with the microops and related state. The buffer may comprise any memory (e.g. one or more random access memory arrays, clocked storage devices such as flops, latches, registers, etc., or combinations of memory arrays and clocked storage devices).

The scheduler 20 may schedule the microops for execution in the execution core 24. When a microop is scheduled, the scheduler 20 may read its source operands from the register file 22 and the source operands may be provided to the execution core 24. Results of microops execution may be written to the register file 22 as well.

The scheduler 20 may be configured to retire microops as they become the oldest microops in the scheduler 20 and once any exception conditions are known from the execution of the microops. Retiring the microops may include committing the results to the "architected state" of the processor 10 (such that the results are not flushed if a subsequent exception occurs). At various points, microops may be referred to as being younger or older than other microops (or the youngest or oldest microop). Generally, a first microop may be younger than a second microop if the first microop is subsequent to the second microop according to the program order of the instructions being executed. A first microop may be older than a second microop if the first microop precedes the second microop according to the program order.

In some cases, an issued microop may be replayed to the scheduler 20. Generally, replay may cause the scheduler 20 to reschedule (reissue) the microop for execution. Replay may be signalled if an event occurs during execution which does not require an exception but does require reexecution to obtain a correct result. The scheduler 20 receives the replay signal, and may update its state to cause the replayed operation to be rescheduled/reissued at a later time. The scheduler 20 may also reschedule any subsequent microops, or at least the subsequent microops that are dependent on the replayed microop. Additional details regarding replay are provided below. On the other hand, if an exception is signalled for a microop, the scheduler 20 may take the exception when the microop is ready to be retired.

The register file 22 may generally comprise any set of registers usable to store operands and results of microops executed in the processor 10. In some embodiments, the register file 22 may comprise a set of physical registers and the mapper 18 may map the logical registers to the physical registers. The logical registers may include both architected registers specified by the instruction set architecture implemented by the processor 10 and temporary registers that may be used as destinations of microops for temporary results (and sources of subsequent microops as well). Generally, the logical registers are identified by AR#s. In other embodiments, the register file 22 may comprise an architected register set containing the committed state of the logical registers and a speculative register set containing speculative register state.

The interface unit 26 may generally include the circuitry for interface the processor 10 to other devices on the external interface. The external interface may comprise any type of interconnect (e.g. bus, packet, etc.). The external interface may be an on-chip interconnect, if the processor 10 is integrated with one or more other components (e.g. a system on a chip configuration). The external interface may be on off-chip interconnect to external circuitry, if the processor 10 is not integrated with other components.

The execution core 24 may include any combination of one or more execution units for executing microops. For example, in the illustrated embodiment, the execution core 24 may include the LSU 28 and the MMU 30. In various embodiments, the execution core 24 may comprise any combination of: one or more address generation units, one or more translation units like the MMU 30, one or more load/store units like the LSU 28, one or more data caches, one or more integer units, one or more floating point units, one or more graphics units, one or more cryptographic units, etc. Generally, the execution core 24 may include any circuitry for executing instructions (or microops, in the illustrated embodiment).

The LSU 28 may be configured to process memory operations (e.g. load and store operations). The memory operations may be derived from instructions having implicit memory operations, or from explicit load/store instructions. In embodiments implementing the PowerPC instruction set architecture, for example, explicit load/store instructions are defined. More particularly, the LSU 28 may be configured to handle load/store ordering, dependency checking, cache miss handling, etc. One or more address generation units (not shown) may generate the addresses accessed by the load/store memory operations, in one embodiment. In other embodiments, the LSU 28 may also perform the address generation. Other embodiments may implement more than one LSU if desired.

The MMU 30 may comprise translation circuitry for translation effective addresses (e.g. load/store effective addresses)

to physical (or real) addresses for accessing memory and/or caches. The address translation mechanism may vary from embodiment to embodiment. For example, the PowerPC instruction set architecture defines a segment lookaside buffer (SLB) that translates effective addresses to virtual addresses, and a page table mechanism that translates virtual addresses to physical addresses. In some cases, portions of the MMU 30 may be physically integrated into other units (e.g. translation data structures caching the results of translations), but may logically be viewed as part of the MMU 30.

It is noted that, while the illustrated embodiment uses a centralized scheduler, other embodiments may implement other microarchitectures. For example, a reservation station/reorder buffer microarchitecture may be used. The reservation stations are effectively distributed schedulers, and may operate in a similar fashion as the scheduler 20 for replayed operations.

Replay Mechanism

The processor 10 implements a replay mechanism which may, in some embodiments, lead to power savings by preventing repeated replays of an instruction operation (e.g. microop) while the same replay case still exists. Generally, the execution core 24 may include one or more replay sources. A replay source may be any circuitry which may detect one or more replay cases during processing of an instruction operation. A replay case may include any event that would lead, at least in some instances, to an incorrect result for the instruction operation being executed or for the operation of the processor 10 as a whole. Thus, replaying the instruction operation is indicated so that the correct result may be generated.

A subset of the replay cases may defined to be "wait for acknowledgement" replay cases. More briefly, the subset may be referred to herein as the "ack subset" and the replay cases in the subset may be referred to as "ack replay cases". The ack subset may include any set of two or more replay cases, up to all of the replay cases, in some embodiments. The ack replay cases may often exist longer than the amount of time that it takes to reschedule/reissue the replayed microop. Reissuing the microop in such cases may merely result in another replay. While no forward progress has been made, power may be consumed in processing the microop to again detect the replay.

The scheduler 20 may be configured to inhibit reissuance of the replayed microop until a corresponding acknowledgement indication (more briefly "ack") is asserted to the scheduler. Each replay case in the ack subset may have a corresponding acknowledgement indication, although replay cases may share the same ack if the same clearing event is used for those replay cases. The acknowledgement indication may have any form. For example, the acknowledgement indication may be a signal, asserted high or asserted low. The acknowledgement indication may be a tag to be matched by the scheduler 20 (e.g. to a scheduler entry, or to a value stored in a scheduler entry). An acknowledgement signal will be used in the example below (or a group of acknowledgement signals together referred to as an acknowledgement vector), although any acknowledgement indication may be used.

Replay cases and the clearing events for a replay case may be detected at any level of accuracy or granularity. For example, in one embodiment, a replay case may be a load microop that hits a store microop in the load/store queue (LSQ). In one implementation, the specific entry in the LSQ may be noted and the ack may be asserted when the specific entry is dequeued. While such an implementation would be most accurate, ensuring that the load microop would not be replayed again due to that store, the implementation may be more complex and more costly in terms of the circuitry needed to realize the implementation. Alternatively, the ack may be asserted whenever any entry in the LSQ is dequeued. Such an implementation is less accurate, and thus the load microop may be replayed again if the dequeued entry is not the entry hit by the load microop, but such an implementation may also be less costly/complex.

For each replay case in the ack subset, at least one corresponding clearing event is identified. The clearing event is an event which may indicate that the replay case has been cleared, and thus will not occur for a microop that was replayed due to the clearing replay case is reissued. Depending on the granularity for which the replay case is identified and for which the clearing event is detected as well, the replay case may or may not actually be cleared. For example, in one embodiment, any entry in the LSQ dequeueing is a clearing event for the load/store hit. If the dequeued entry is not the store that the load hits, the replay case will be detected again. At some point, however, the entry having the store that the load hits may be dequeued, and the replay case will not be detected.

Figure 2:
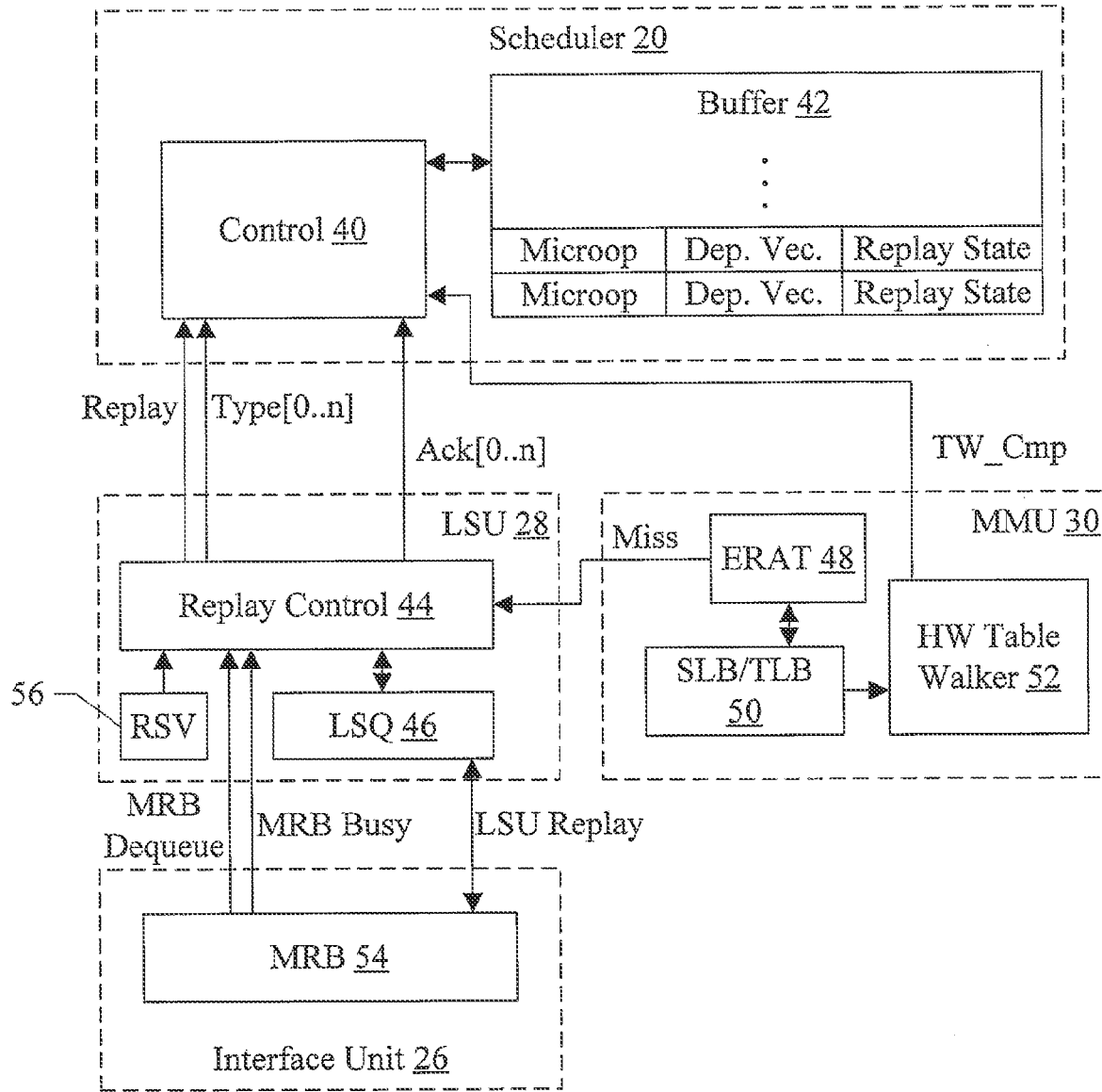
FIG. 2 is a block diagram of one embodiment of a portion of the processor shown in FIG. 1.

Turning next to FIG. 2, a portion of the processor 10 shown in FIG. 1 for one embodiment is shown in greater detail. In the embodiment of FIG. 2, the scheduler 20, the LSU 28, the MMU 30, and the interface unit 26 are shown. Interconnect related to replaying a microop and acks for replay cases in the ack subset is also shown. Particularly, in the illustrated embodiment, the scheduler 20 includes a control unit 40 coupled to a buffer 42. The LSU 28 includes a replay control unit 44 coupled to an LSQ 46 and an RSV bit storage 56. The MMU 30 includes an effective to real address translation (ERAT) 48 coupled to a segment lookaside buffer (SLB)/translation lookaside buffer (TLB) 50 which is further coupled to a hardware table walker circuit 52. The interface unit 26 includes a memory request buffer (MRB) 54. The hardware table walker 52 is coupled to provide a table walk complete (TW_Cmp) signal to the control unit 40. The ERAT 48 is coupled to provide a miss signal to the replay control unit 44.

The replay control unit 44 is coupled to receive MRB busy and MRB dequeue signals from the MRB 54, and is coupled to provide a replay signal, a type vector (Type[0 ... n]) and an ack vector (Ack[0 ... n]) to the control unit 40. An LSU replay interface may also be supported, in one embodiment, between the LSQ 46 and the MRB 54.

The control unit 40 may be configured to scan the valid entries in the buffer 62 and schedule microops for execution in the execution core 24. For a given microop, the control unit 40 may examine the replay state for the microop as part of determining whether or not the microop may be scheduled. That is, if the microop was previously scheduled and replayed with an ack replay case, the microop may not be scheduled until the corresponding ack has been received by the control unit 40.

In the illustrated embodiment, the LSU 28, the MMU 30, and the interface unit 26 may each be an example of a replay source. The replay control unit 44, responsive to a replay case signalled by any of the replay sources, may assert the replay signal to the control unit 40 and may indicate the replay type via the type vector.

The LSU 28 may detect replay cases in the LSQ 46. Each of the replay cases in the LSQ 46 may be an ack replay case, and the clearing event may be an LSQ dequeue. For example, the LSQ 46 being full may be a replay case. In other embodiments, an LSQ entry may be assigned by the mapper 18 and LSQ fullness may not be a replay case. Additionally, a load microop hitting a store microop in the LSQ 46 that provides one or more bytes accessed by the load but not all of the bytes accessed by the load (referred to as a "partial load/store hit") may be a replay case. A load "hitting" a store may refer to the addresses accessed by the load and the store being equal within a predefined granularity. The granularity may vary from embodiment to embodiment. The partial load/store hit will continue to exist until the store is dequeued from the LSQ 46. Accordingly, the partial load/store hit replay case may be an ack replay case, and the ack may be asserted when an entry in the LSQ 46 is dequeued. Other replay cases in the LSQ may also be identified (e.g. to ensure ordering requirements between an executing load/store microop and previous microops, to ensure coherency, etc.). A replay type in the type vector may be the LSQ replay, and a corresponding ack signal in the ack vector may be assigned to the LSQ dequeue clearing event. The replay control unit 28 may assert the LSQ replay type in response to the LSQ 46 detecting a replay case, and may assert the corresponding ack signal in the ack vector in response to an LSQ dequeue.

Another ack replay case that may be detected by the LSU 28 is a load and reserve microop executed when the reserve bit is already set. The load and reserve microop may be part of the load and reserve (larx) instruction in the PowerPC instruction set. The larx executes and sets a reservation for a block of data including the data accessed by the larx (e.g. a cache block). The larx is intended for use with the store conditional (stwcx) instruction to produce various atomic update primitives. The store conditional instruction conditionally stores a word to its address if the reservation is still set when the store conditional is executed. Otherwise, the store is not performed. The reserved block is monitored for update by the processor 10, and the reservation is cleared if a modification to the block is detected. In one embodiment, the reservation is represented by the RSV bit 56, which may be set to indicate an active reservation is being maintained and cleared to indicate that there is no reservation active (or vice versa for the states of the bit). In one embodiment, a larx microop is not permitted to execute if the RSV bit 56 is still set from a previous larx, unless that larx microop is the oldest microop in the processor 10. The clearing events may thus be either an ack from the LSU 28 that the RSV bit 56 has been cleared, or the larx becoming the oldest microop in the processor 10 (which the scheduler 20 may be able to determine internally). The replay control unit 28 may assert the "larx with Rsv set" replay type in response to the detecting the set RSV bit 58, and may assert the corresponding ack signal in the ack vector in response to the RSV bit 58 being cleared.

The MMU 30 may detect a replay case if a miss in the ERAT 48 is detected. The ERAT 48 is a first level translation circuit (that is, the ERAT is accessed first in response to a request for translation). The ERAT 48 caches the result of translating both through the segmentation and paging mechanisms defined in the PowerPC architecture. Thus, an effective address may be translated directly to a real address in the ERAT 48. If a miss in the ERAT 48 is detected, the SLB and TLB 50 may be consulted to determine if a translation exists from the effective to virtual address (in the SLB) and from the virtual address to the real address (in the TLB). If so, the translation may be loaded into the ERAT 48. If a hit in the SLB is detected but a miss in the TLB is detected, the hardware table walker 52 may search the page tables created by software and stored in memory to locate a translation. A miss in the SLB or a failure to locate a translation in the page tables results in an exception.

The table walk may typically be a long latency operation, while loading the ERAT 48 from the SLB/TLB 50 may be a short latency operation. Accordingly, an ERAT miss on the initial issuance of a microop may cause a replay without acknowledgement, but with at least a predetermined delay that permits the ERAT to be loaded from the SLB/TLB 50 (e.g. one clock cycle, in one implementation). If an ERAT miss is detected on a subsequent issuance of the microop may be detected as an ack replay case, and reissuance may be inhibited until a corresponding ack is received. In this embodiment, the corresponding ack is the assertion of the TW_Cmp signal by the hardware table walker 52, in response to completing the table walk (with or without successfully locating a translation).

The ERAT 48 signals miss to the replay control unit 44 in the illustrated embodiment, and the replay control unit 44 may assert the MMU replay type to the control unit 40. The scheduler 40 may replay the load/store microop with the predetermined delay after the initial issuance of the microop, or await the TW_Cmp ack assertion from the hardware table walker 42 if the replay occurs for a subsequent issuance of the microop.

The MRB 54 may detect that it is busy at the time a load/store microop is executed and needs an entry in the MRB 54. For example, the MRB 54 may be full and a load/store microop that is a cache miss may need to enqueue a request for the missing cache block. Additionally, a load/store microop may hit a request in the MRB 54 that is outstanding (e.g. a store hitting on an earlier load in the MRB 54), or a load/store microop may hit a request that has coherency activity outstanding on the external interface. In such cases, the MRB 54 may assert the MRB busy signal to the replay control unit 44. The replay control unit 44 may assert the replay signal and indicate MRB replay case on the type vector. The clearing event for the MRB replay case may be any dequeue of the MRB 54. The MRB 54 indicates the clearing event by asserting the MRB dequeue signal, and the replay control unit 44 may assert the corresponding ack signal in the ack vector to the control unit 40.

In addition to the various ack replay cases that described above, any remaining replay cases (i.e. those that do not require an ack) may be grouped together and signalled as a "no ack" replay type. For this replay type, the control unit 40 need not await an ack and may reschedule/reissue the replayed microop as desired. It is noted that, while the ack vector is shown having the same number of bits as the type vector in FIG. 2, some bits may not be implemented. For example, the no ack replay cases may not have a corresponding ack signal in the ack vector. Additionally, the TW_Cmp signal is the ack for the MMU replay case, so that ack signal may not be implemented in the ack vector.

It is noted that, in other embodiments, there may be other ack replay cases in addition to the ack replay cases described above. Furthermore, any subset of the above ack replay cases (and additional replay cases, if desired) may be implemented in other embodiments.

In one embodiment, an LSU replay interface may be supported between the MRB 54 and the LSQ 46 as well. Some replay cases may be handled by reissuing to the MRB 54 from the LSQ 46, and the scheduler 20 need not be replayed for those replay cases. Additional power consumption may be saved by reissuing from the LSQ 46, in some embodiments. For example, three types of replay may be supported in one embodiment between the LSQ 46 and the MRB 54: replay after any MRB entry dequeues; replay after a specific MRB entry dequeues; and replay after any LSQ entry dequeues.

Replay after any MRB entry dequeues may be used, for example, if the MRB is full when a microop has a cache miss and is to enqueue in the MRB 54 to fetch the missing cache block from memory. Once an entry dequeues, the cache miss may be enqueued in the freed entry. Replay after a specific MRB entry dequeues may be used, e.g., if a store is hitting an outstanding load in the specific MRB entry. When that entry dequeues, the store may be placed into the MRB 54 (which may make the store globally visible, in this embodiment). Replay after any LSQ entry dequeues may be used for stores that are ready to be made globally visible, but younger loads are in the LSQ that have not completed. When an LSQ entry dequeues, a younger load may be completing and the store may be able to complete.

In addition to the replay interface discussed above, there may also be a completion interface used to complete store microops that miss in the data cache. Once the store has been address ordered on the external interface, the store may be completed in the LSQ 46.

The buffer 42 comprises a plurality of entries, two of which are illustrated in FIG. 2. Each entry may store a microop (including various state such as source operand numbers, AR#s, etc.), a dependency vector indicative of which entries in the buffer 42 the microop depends on (e.g. for source operands), and a replay state. The dependency vector may comprise a bit for each entry in the buffer 42. If the bit is set, the microop has a dependency on the microop in the corresponding entry. The replay state may indicate whether or not the microop has been replayed and, if the replay case is in the ack subset, whether or not the corresponding ack has been received. The replay state may be represented in any desired fashion. For example, in one embodiment, the replay state may comprise a bit for each replay type in the ack subset. The bit may be set when the corresponding replay case is signalled, and may act like a dependency in the dependency vector, preventing the microop from being rescheduled and reissued. When the corresponding ack is received, the bit may be reset.

It is noted that, while the replay control unit 44 centralizes signalling of replay types and acks for many of the replays, other embodiments need not implement the replay control unit 44. Each replay source may directly signal its replay types to the scheduler 20, and each replay source may also directly signal its ack (e.g. similar to the TW_Cmp ack by the MMU 30 in FIG. 2).

Figure 3:
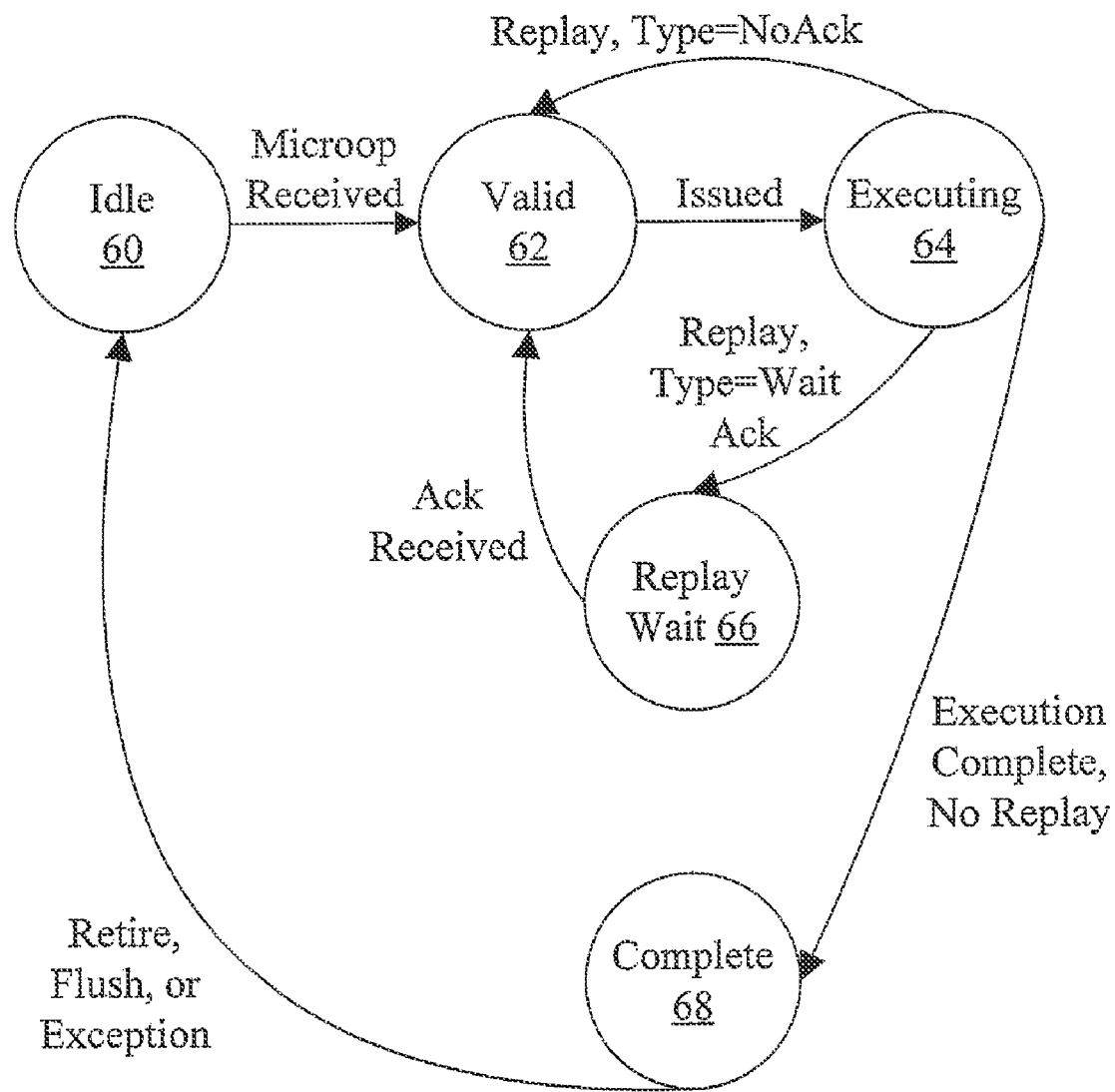
FIG. 3 is a block diagram of one embodiment of a scheduler state machine.

Turning next to FIG. 3, a block diagram of one embodiment of a state machine that may be implemented by one embodiment of the control unit 40 with respect to a given microop in a given buffer 42 entry is shown. A similar state machine may be implemented in parallel for each other entry in the buffer 42. In the illustrated embodiment, the state machine includes an idle state 60, a valid state 62, an executing state 64, a replay wait state 66, and a complete state 68.

In the idle state 60, there is no microop stored in the corresponding entry. The idle state 60 may be entered when a microop is retired or otherwise deleted from an entry, and may be exited when a microop is received into the entry. The idle state 60 may be represented, e.g., by a valid bit in the entry. That state machine transitions from the idle state 60 to the valid state 62 in response to a microop being received into the entry. The state machine remains in the valid state 62 until the microop is issued by the control unit 40, at which time the state machine transitions to the executing state 64.

In the executing state 64, the microop is being executed in the execution core 24. Depending on the result of the execution, the state machine may transition to either the replay wait state 66, the valid state 62, or the complete state 68. The state machine transitions to the complete state 68 if the execution completes without replay. On the other hand, if the execution completes with a replay of the no ack type, the state machine transitions to the valid state 62 and the microop is again eligible for issuance. If the execution completes with an ack replay case, the state machine transitions to the replay wait state 66.

In the replay wait state 66, the control unit 40 does not select the microop for reissuance. Once the ack corresponding to the identified replay case is received, the state machine transitions to the valid state 62 and the microop is again eligible for reissuance. The replay wait state 66 may, e.g., be represented in the replay state of the entry.

From the complete state 68, the state machine transitions to the idle state 60 when the microop is deleted from the scheduler 20 (e.g. by retirement, flush, or exception). In addition to the transitions shown in FIG. 3, there may also be a transition from any state (other than the idle state 60) to the valid state 62 if the replay of a previous microop in the scheduler causes a replay of the microop in the entry.

Figure 4:
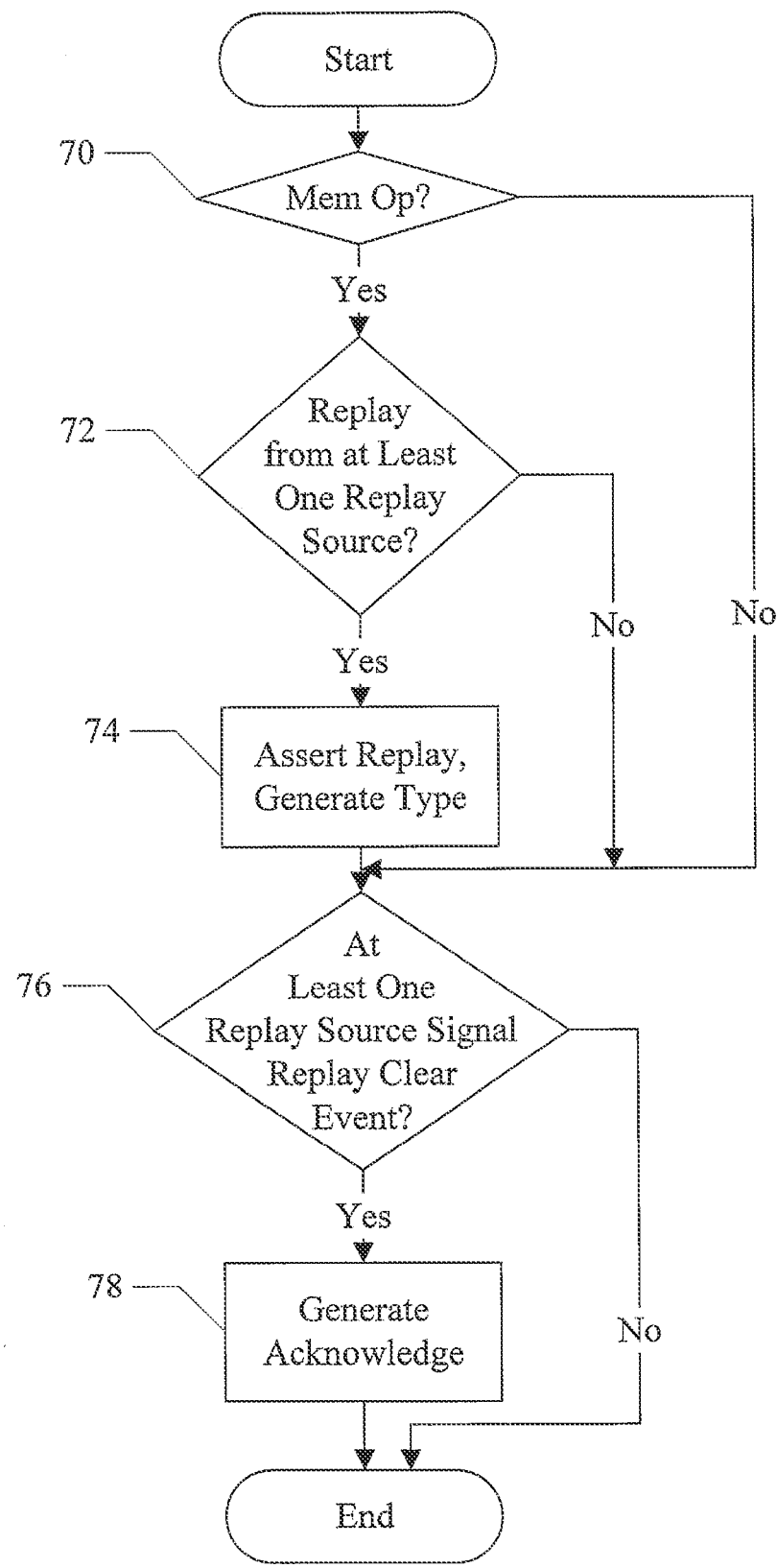
FIG. 4 is a flowchart illustrating operation of one embodiment of a replay control unit.

Turning now to FIG. 4, a flowchart is shown illustrating operation of one embodiment of the replay control unit 44. While the blocks are shown in a particular order in FIG. 4 for ease of understanding, any order may be used. Blocks may be performed in parallel by combinatorial logic in the replay control unit 44. Blocks, combinations of blocks, and/or the flowchart as a whole may be pipelined over multiple clock cycles.

In the present embodiment, only memory operations (load/store microops) may be directly replayed during execution. Other microops may be replayed as a result of the load/store replays (e.g. dependent microops, or all microops subsequent to a replayed microop, in various embodiments). Accordingly, the replay control unit 44 may check if a memory operation is being executed (decision block 70). If there is a memory operation in execution (decision block 70, "yes" leg), and at least one replay source signals a replay of the memory op (decision block 72, "yes" leg), the replay control unit 44 may assert the replay signal to the control unit 40 in the scheduler 20, and may generate the replay type vector (block 74).

Additionally, if at least one replay source is signalling a replay clearing event (decision block 76, "yes" leg), the replay control unit 44 may generate the acknowledgement vector (block 78). In one embodiment, more than one acknowledgement may be transmitted on the acknowledgement vector concurrently (e.g. the vector may be a multi-hot encoding of the acknowledgements).

Figures 5, 6:
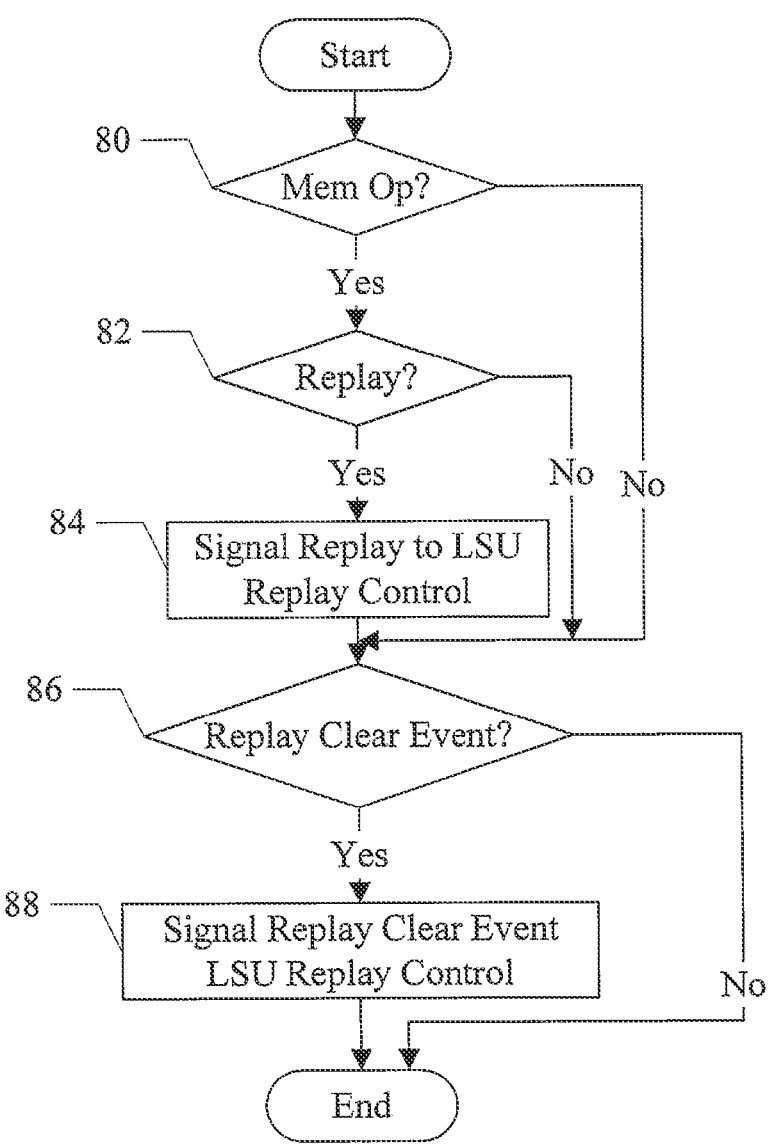
FIG. 5 is a table illustrating one embodiment of replay types.
FIG. 6 is a flowchart illustrating operation of one embodiment of a replay source.

FIG. 5 is a table illustrating an encoding of the replay type vector that may be implemented by one embodiment of the replay control unit 44. The bits of the type vector are shown, and their assigned meanings are also shown. Thus, in the present embodiment the type vector is a one hot encoding of replay types. Bit 0 of the vector is assigned to the no ack replay type. Bit 1 is the MMU replay type (which is a no ack type for the initial execution and replay of the microop, but an ack type for a subsequent execution and replay of the microop (if any)). Bit 2 is the LSQ replay type, which is an ack replay type. Bit 3 is the MRB replay type, which is also an ack replay type. Bit 4 is the larx with RSV set replay type, which is an ack replay type but reissue is also permitted if the larx microop is the oldest microop remaining in the scheduler 20.

The ack vector may have a similar definition for the acks for each replay type that may receive an ack. Thus, bit 0 of the ack vector may not be implemented (because bit 0 of the replay type is the no ack type). Additionally, bit 1 of the ack vector may not be implemented in this embodiment because the MMU may provide its ack directly to the scheduler 20. Bits 2-4 of the ack vector may be implemented as ack signals for the corresponding types.

While a one-hot encoding of the type vector is shown in the illustrated embodiment, other embodiments may use any other encoding to transmit the replay type. Similarly, while a multi-hot encoding of the ack vector is shown, other embodiments may use any other encoding to transmit acknowledge indications.

FIG. 6 is a flowchart illustrating operation of one embodiment of a replay source (e.g. any of the LSU 28, the MMU 30, and the interface unit 26, in the illustrated embodiment). While the blocks are shown in a particular order in FIG. 6 for ease of understanding, any order may be used. Blocks may be performed in parallel by combinatorial logic in the replay source. Blocks, combinations of blocks, and/or the flowchart as a whole may be pipelined over multiple clock cycles.

If a memory operation is in execution and the replay source detects a replay case (decision blocks 80 and 82, "yes" legs), the replay source may signal the replay control unit 44 (block 84). Additionally, if the replay source detects any clearing events (decision block 86, "yes" leg), the replay source may signal the replay clear event to the replay control unit 44 (block 88) or may directly generate the ack to the scheduler 20, in various embodiments.

Numerous variations and modifications will become apparent to those skilled in the art once the above disclosure is fully appreciated. It is intended that the following claims be interpreted to embrace all such variations and modifications.

What is claimed is:

1. A processor comprising:
a scheduler configured to issue a first instruction operation to be executed; and
a memory management unit coupled to receive the first instruction operation, and wherein the memory management unit is configured to replay the first instruction operation responsive to detecting a miss in a translation buffer within the memory management unit for the first instruction operation;
wherein the scheduler, in response to an initial detection of the replay from the memory management unit for the first instruction operation, is configured to reissue the first instruction operation after at least a predetermined delay and without receiving an acknowledgement indication, and wherein the predetermined delay is sufficient for the memory management unit to search a next level translation buffer structure and load a translation into the translation buffer in response to a hit in the next level translation buffer structure.

2. The processor as recited in claim 1 wherein, in response to a subsequent detection of the miss in the translation buffer responsive to the reissuance of the first instruction operation, the scheduler is configured to inhibit a second reissuance of the first instruction operation until the memory management unit transmits the acknowledgement indication.

3. The processor as recited in claim 2 wherein the memory management unit is configured to transmit the acknowledgement indication responsive to completing a table walk for the miss.

4. The processor as recited in claim 1 wherein the memory management unit is included in an execution core that is coupled to the scheduler and is configured to execute instruction operations issued by the scheduler, wherein the execution core comprises a plurality of replay sources including the memory management unit, wherein the plurality of replay sources are configured to cause a replay of a given instruction operation responsive to detecting at least one of a plurality of replay cases, and wherein the execution core is configured to transmit an acknowledgement indication for a subset of the plurality of replay cases comprising two or more of the plurality of replay cases, wherein the acknowledgement indication is indicative that a clearing event corresponding to an identified replay case for the given instruction operation has been detected.

5. The processor as recited in claim 4 wherein the scheduler is configured to inhibit issuance of the given instruction operation subsequent to the replay of the given instruction operation for the identified replay case until the acknowledgement indication is transmitted that corresponds to the identified replay case.

6. The processor as recited in claim 1 wherein the scheduler is configured to issue a second instruction operation from the scheduler while the first instruction operation is inhibited from issue, wherein the second instruction operation is subsequent to the first instruction operation in program order.

7. A method comprising:
issuing a first instruction operation to be executed;
replaying the first instruction operation responsive to detecting a miss in a translation buffer of a memory management unit for the first instruction operation;
in response to the replaying, reissuing the first instruction operation after at least a predetermined delay and without receiving an acknowledgement indication; and
during the predetermined delay, the memory management unit searching a next level translation buffer structure and loading a translation into the translation buffer in response to a hit in the next level translation buffer.

8. The method as recited in claim 7 wherein the reissuing results in a completion of the first instruction operation.

9. The method as recited in claim 7 further comprising:
issuing a second instruction operation to be executed;
replaying the second instruction operation responsive to detecting a miss in the translation buffer;
in response to the replaying, reissuing the second instruction operation after at least the predetermined delay and without receiving the acknowledgement indication;
during the predetermined delay, the memory management unit searching the next level translation buffer structure and detecting a miss in the next level translation buffer structure for the second instruction operation;
replaying the second instruction a second time in response to the reissuing.

10. The method as recited in claim 9 further comprising:
inhibiting reissue of the second instruction operation responsive to replaying the instruction operation a second time until the acknowledgement indication is received.

11. The method as recited in claim 10 further comprising the memory management unit generating the acknowledgement indication responsive to completing a table walk for the miss.

* * * * *